US005164529A

United States Patent [19]

Saito

[11] Patent Number: 5,164,529

[45] Date of Patent: Nov. 17, 1992

[54] INTERRUPTION CONTROL APPARATUS FOR USE IN PERFORMANCE INFORMATION PROCESSING SYSTEM

[75] Inventor: Tsutomu Saito, Sizuoka, Japan

[73] Assignee: Kawai Musical Instrument Mfg. Co., Ltd., Sizuoka, Japan

[21] Appl. No.: 368,647

[22] Filed: Jun. 20, 1989

[30] Foreign Application Priority Data

Jun. 21, 1988 [JP] Japan .............................. 63-153962

[51] Int. Cl.[5] ........................ G01H 1/00; G01H 1/02

[52] U.S. Cl. ........................................ 84/612; 84/636; 84/652; 84/668

[58] Field of Search ................ 84/DIG. 12, 612, 636; 364/702

[56] References Cited

U.S. PATENT DOCUMENTS

| | | | |
|---|---|---|---|
| 4,323,978 | 4/1982 | Hoefert | 364/702 |
| 4,700,604 | 10/1987 | Morikawa | 84/DIG. 12 |
| 4,733,593 | 3/1988 | Rothbart | 84/DIG. 12 |
| 4,876,937 | 10/1989 | Suzuki | 84/612 |
| 4,924,745 | 5/1990 | Kimpara et al. | 84/609 |
| 4,957,552 | 9/1990 | Iwase | 84/622 |

*Primary Examiner*—William M. Shoop, Jr.
*Assistant Examiner*—Brian Sircus

[57] ABSTRACT

An interruption control apparatus for controlling interruptions of a performance information processor for processing performance information of a piece of music. The interruption control apparatus includes a first time control unit for regulating the length of a time interval between successive interruptions of the performance information processor according to a pre-set tempo in such a manner that the regulated time interval is limited within a predetermined constant range, and for outputting an interruption signal at the regulated time interval; a second time control unit for receiving the interruption signal and increasing a parameter of a register by an increment, of which the value varies inversely as the pre-set tempo, every reception of the interruption signal and further transferring performance information to the performance information processor each time the parameter reaches a predetermined value and then resetting the parameter to become zero; and an interruption processing unit for receiving the interruption signal and interrupting the performance information processor in response to the received interruption signal.

4 Claims, 12 Drawing Sheets

| DISPLAYED RHYTHM | PROCESSED RHYTHM |
|---|---|
| 1/2 | 4/8 |
| 2/2 | 8/8 |
| 3/2 | 12/8 |
| 1/4 | 2/8 |
| 2/4 | 4/8 |
| 3/4 | 6/8 |
| 4/4 | 8/8 |
| 5/4 | 10/8 |
| 6/4 | 12/8 |
| 7/4 | 14/8 |
| 1/8 | 1/8 |
| 2/8 | 2/8 |
| 3/8 | 3/8 |
| 4/8 | 4/8 |
| 5/8 | 5/8 |
| 6/8 | 6/8 |
| 7/8 | 7/8 |
| 8/8 | 8/8 |
| 9/8 | 9/8 |
| 10/8 | 10/8 |
| 11/8 | 11/8 |
| 12/8 | 12/8 |
| 13/8 | 13/8 |
| 14/8 | 14/8 |
| 15/8 | 15/8 |

| ADDRESS | BIT7 | 6 | 5 | 4 | 3 | 2 | 1 | 0 |
|---|---|---|---|---|---|---|---|---|
| 0 | ▷ | ◁ | △ | ▽ | JOB | – | – | – |
| 1 | TR1 | TR2 | TR3 | TR4 | TEMPO | – | – | – |
| 2 | START | STOP | RECORD | FF | REWIND | – | – | – |
| 3 | INCM(+) | INCM(-) | – | – | – | – | – | – |

PANEL MAP PORTION (KEYS ARE OPERATED) 30

| ADDRESS | BIT7 | 6 | 5 | 4 | 3 | 2 | 1 | 0 |
|---|---|---|---|---|---|---|---|---|
| 4 | ▷ | ◁ | △ | ▽ | JOB | – | – | – |
| 5 | TR1 | TR2 | TR3 | TR4 | TEMPO | – | – | – |
| 6 | START | – | RECORD | – | – | – | – | – |

PANEL MAP PORTION (LED LAMPS TURN ON) 30

TRACK MEMORY

FIG. 10

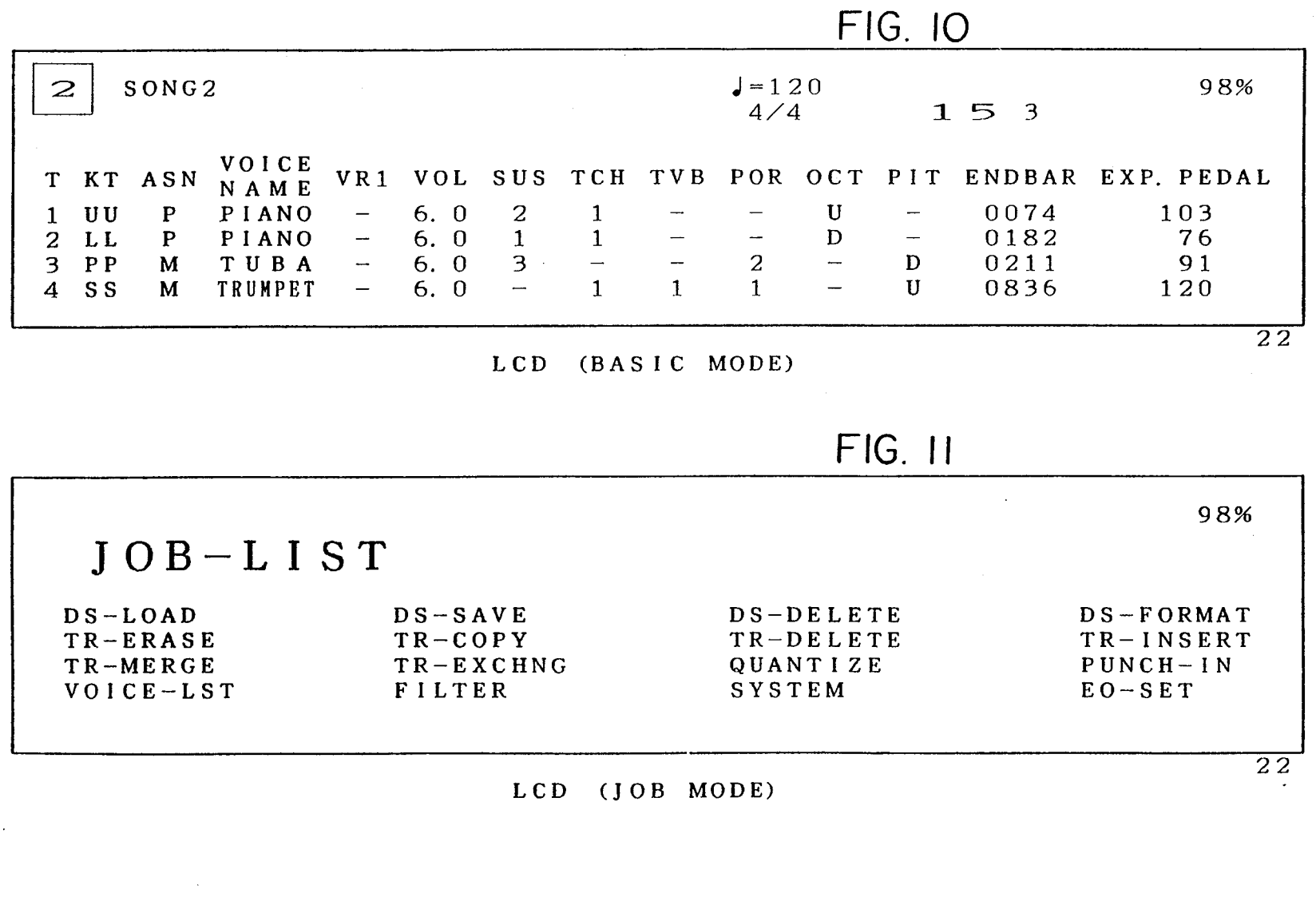

2 SONG2 ♩=120 4/4 1 5 3 98%

| T | KT | ASN | VOICE NAME | VR1 | VOL | SUS | TCH | TVB | POR | OCT | PIT | ENDBAR | EXP. PEDAL |
|---|---|---|---|---|---|---|---|---|---|---|---|---|---|
| 1 | UU | P | PIANO | – | 6. 0 | 2 | 1 | – | – | U | – | 0074 | 103 |
| 2 | LL | P | PIANO | – | 6. 0 | 1 | 1 | – | – | D | – | 0182 | 76 |
| 3 | PP | M | TUBA | – | 6. 0 | 3 | – | – | 2 | – | D | 0211 | 91 |
| 4 | SS | M | TRUMPET | – | 6. 0 | – | 1 | 1 | 1 | – | U | 0836 | 120 |

22

LCD (BASIC MODE)

FIG. 11

98%

JOB–LIST

| | | | |
|---|---|---|---|
| DS–LOAD | DS–SAVE | DS–DELETE | DS–FORMAT |
| TR–ERASE | TR–COPY | TR–DELETE | TR–INSERT |
| TR–MERGE | TR–EXCHNG | QUANTIZE | PUNCH–IN |
| VOICE–LST | FILTER | SYSTEM | EO–SET |

22

LCD (JOB MODE)

FIG. 12

| INCREMENT | KT CHANNEL CONVERTER ASSIGNMENT | VOICE TIMBRE | VOL VOLUME | SUS SUSTAIN | POR PORTAMENTO | OCT OCTAVE UP/DOWN | PIT PITCH UP/DOWN |
|---|---|---|---|---|---|---|---|
| 0 | UU | STRINGS1 | 1. 0 | — | — (NO PORTAMENTO) | 1 OCTAVE DOWN | AT100CENT DOWN |
| 1 | UL | STRINGS2 | 1. 5 | 1 | 1 (SLOW) | NO CHANGE | NO CHANGE |
| 2 | UP | STRINGS3 | 2. 0 | 2 | 2 (ORDINARY) | 1 OCTAVE UP | AT100CENT UP |
| 3 | US | | 2. 5 | 3 | 3 (FAST) | | AT = AFTER TOUCH |
| 4 | LU | | 3. 0 | | | | |
| 5 | LL | | 3. 5 | | | | |
| 6 | LP | | 4. 0 | | | | |
| 7 | LS | : | 4. 5 | | | | |
| 8 | PU | : | 5. 0 | | | | |
| 9 | PL | : | 5. 5 | | | | |
| 10 | PP | : | 6. 0 | | | | |
| 11 | PS | : | 6. 5 | | | | |
| 12 | SU | : | 7. 0 | | | | |
| 13 | SL | : | | | | | |
| 14 | SP | | | | | | |
| 15 | SS | | | | | | |
| : | | | | | | | |
| : | | | | | | | |
| 23 | | COSMIC3 | | | | | |
| 24 | | PIANO | | | | | |
| 25 | | HARPSI CHORD | | | | | |
| : | | : | | | | | |
| : | | : | | | | | |
| 63 | | FUNK BASS | | | | | |
| 64 | | COSMIC8 | | | | | |

FIG. 14

| ADDRESS | 15 14 13 12 11 10 9 8 | 7 | 6 | 5 4 3 | 2 1 0 |
|---|---|---|---|---|---|
| 0 | INTERFACE TO FLOPPY DISK | | | | |
| 1 | NO. OF NEXT SECTOR | USED | | SONG NO. | TRACK NO. |
| 2 | NO. OF NEXT SECTOR | USED | – | SONG NO. | TRACK NO. |
| : | : | | | | |
| 3 F | NO. OF NEXT SECTOR | USED | – | SONG NO. | TRACK NO. |

SECTOR MANAGING AREA

FIG. 15

| ADDRESS | NO. OF NEXT SECTOR | USED | – | SONG NO. | TRACK NO. |
|---|---|---|---|---|---|
| 0 | INTERFACE TO FLOPPY DISK | | | | |
| 1 | 0 2 | 8 0 | | | |
| 2 | 0 0 | 8 0 | | | |
| 3 | 0 4 | 8 1 | | | |
| 4 | 0 5 | 8 1 | | | |
| 5 | 0 6 | 8 1 | | | |
| 6 | 0 0 | 8 1 | | | |
| 7 | 0 0 | 8 2 | | | |
| 8 | 0 9 | 8 3 | | | |
| 9 | 0 A | 8 3 | | | |
| A | 0 0 | 8 3 | | | |
| B | 0 0 | 8 7 | | | |
| C | 0 0 | 0 0 | | | |
| D | 0 0 | 0 0 | | | |
| : | : | : | | | |

SECTOR MANAGING AREA (EXAMPLE)

INTERRUPTION CONTROL APPARATUS FOR USE IN PERFORMANCE INFORMATION PROCESSING SYSTEM

BACKGROUND OF THE INVENTION

1. Field of the Invention

This invention generally relates to an information processing system for controlling a musical performance by using digital electronic musical instruments, and more particularly, to an interruption control apparatus used in the information processing system for controlling various interruption processes required for processing the information (hereinafter referred to as the performance information) used to play a piece of music at an appropriate timing corresponding to a specific tempo used in the performance of the piece of music.

2. Description of the Background Art

A conventional automatic system for playing a piece of music by using an information processor (hereinafter referred to as an automatic performance system) automatically renders the piece by first storing the performance information required for playing the piece of music in a storage device such as a RAM, then sequentially reading the stored performance information from the RAM, and further, converting the read information into electric signals corresponding to musical tones. In this case, the process of sequentially reading the information for playing a piece of music is synchronized with the process of incrementing the content of a register used for controlling tempo of the performance of a piece of music (hereunder referred to as a tempo register), which is incremented at a rate corresponding to the tempo selected by a player or user of the automatic performance system for playing the piece of music. Further, the content of the tempo register is incremented upon each periodic interruption of a sequencer, which is a modular component of the automatic performance system, by adding one (1) there to.

FIG. 1 (A) is a graph showing the relationship between a regular interval between one interruption and the next, and the tempo of the performance of a piece of music, when using the conventional automatic performance system. As described above, the time interval between successive interruptions (hereunder referred to as the time interval) is set in the apparatus in such a manner that it corresponds to the tempo selected by the user. Further, the tempo (i.e., the speed at which a piece of music is performed) is indicated by a number of beats per minute, and therefore, if the time interval is selected to be, for example, (1/96) times the length of a time corresponding to a quarter-note, and simultaneously, the tempo is selected to be as slow as 50 beats, each corresponding to a quarter-note per minute, the time interval has a relatively large value, given as follows:

$$60\text{[seconds (sec)]}/(50\times 96)=12.5\text{[milliseconds (msec)]}.$$

Conversely, if the tempo is selected to be as fast as 400 beats, each corresponding to a quarter-note per minute, the time interval has a relatively small value, determined as follows:

$$60\text{[seconds (sec)]}/(400\times 96)=1.56\text{[milliseconds (msec)]}.$$

Accordingly, when an 8-bit or 16-bit general-purpose central processing unit (CPU) is used in conventional electronic musical instruments such as a sequencer, it usually takes approximately 1 to 4 (msec) to effect a key assigning process, a tablet assigning process, and so on. Particularly, if another process is effected, while data recorded on a plurality of tracks is accessed by the sequencer, it will often take more than 5 msec to effect the above process.

Therefore, from the point of view of the capability of the existing general-purpose CPU, an appropriate time interval between successive interruptions of a general purpose CPU included in the sequencer should be within 3 (msec) to 6 (msec). If the period of the interruption is shorter than such an appropriate value, the process exceeds the capability of the CPU, and conversely, if the period is longer, the capability of the CPU cannot be effectively utilized, resulting in a loss of the utility of circuits of the electronic musical instruments. The present invention has been created to eliminate the above described drawback of the prior art.

SUMMARY OF THE INVENTION

Accordingly, an object of the present invention is to provide an interruption control apparatus of a performance information processing system having a performance information processor which can appropriately regulate the time interval of the interruption of the processor in such a manner that a value most appropriate to the capability of a CPU is obtained, to thereby smoothly effect the performance information processing.

To achieve the above object, in accordance with the present invention there is provided an interruption control apparatus in a performance information processing system having a performance information processor for processing performance information of a piece of music by an electronic musical instrument, which includes a tempo setting means for pre-setting tempo for playing the piece of music, a first time control means for regulating the length of a time interval between successive interruptions of the performance information processor, according to the value of the pre-set tempo; an interruption processing means for adjusting timing data, which proportional to the time interval and is used by the performance information processor for processing the performance information, by an increment at each interruption; and a second time control means for regulating the increment in such a manner that the actual tempo of the performance of the piece of music under the control of the tempo pre-set by the tempo setting means.

Namely, referring to FIG. 2, the tempo setting means 1 first sets the tempo of the performance of a piece of music; for example, the set value of the tempo is assumed to be 150 beats, each corresponding to a quarter-note per minute, and further, the time interval between the successive interruptions of the sequencer is also assumed to be (1/96) times the length of a time corresponding to a quarter-note. Then the first time control means sets the appropriate value of the time interval according to the tempo set by the tempo setting means. As seen from FIG. 1(B), the time interval is set to be as follows:

$$60\text{[sec]}/(150\times 96)=4.16\text{[msec]}$$

Here it should be noted that, if the set value of the tempo is twice the currently set value, i.e., 300 beats each corresponding to a quarter-note per minute, the time interval is determined to have the same value 4.16 (msec). Accordingly, the second time control means 400, which effects the time control by counting clock pulses and incrementing the content of a register by a specific amount, i.e., an increment S, doubles the amount of the increment S. For example, if the increment S is 4 when the tempo is 150 beats each corresponding to a quarter-note, the value of the increment S is increased to 8 when the tempo is 300 beats each corresponding to a quarter-note. Further, if the tempo is half of that stated above, i.e., 75 beats each corresponding to a quarter-note, the first time control means 200 also sets the time interval as 4.16 (msec) and the second time control means 400 effects a time control at a half increment, i.e., the increment S is set as 2.

Therefore, in the example of FIG. 1(B), the range of the period of the interruption controlled by the first time control means 200 is limited to a constant value ranging from 6.25 (msec) to 3.28 (msec). Namely, the time interval between the successive interruptions becomes most appropriate for the capability of the processing means 300, and thus the performance information can be smoothly processed. Note, various modifications of the first and second time control means 200 and 400 other than those described above with reference to FIG. 1(B) can be employed in the system of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features, objects and advantages of the present invention will become apparent from the following description of a preferred embodiment with reference to the drawings, which are given by way of illustration only and are thus not limitative of the present invention in which like reference characters designate like or corresponding parts throughout, and in which:

FIG. 8 is a diagram showing the content stored in a panel map portion of the system of FIG. 3 when the keys are operated;

FIG. 9 is a diagram showing the content stored in a panel map portion of the system of FIG. 3 when the light emitting diode (LED) lamps on the panel of the system thereof are turned on;

FIG. 10 is a diagram showing the content displayed on an LCD display of the system of FIG. 3 in a basic mode;

FIG. 11 is a diagram showing the content displayed on an LCD display of the system of FIG. 3 in a JOB mode;

FIG. 12 is a diagram showing the values of parameters set by an incrementer of the system of FIG. 3;

FIG. 13 is a diagram showing the content of a track memory of the system of FIG. 3;

FIG. 14 is a diagram showing the content of a sector managing area of the track memory of the system of FIG. 3;

FIG. 15 is a diagram showing the content of a concrete example of the sector managing area of the system of FIG. 3;

DESCRIPTION OF THE PREFERRED EMBODIMENT

Hereinafter, a preferred embodiment of the present invention will be described with reference to the accompanying drawings.

Figure 3:
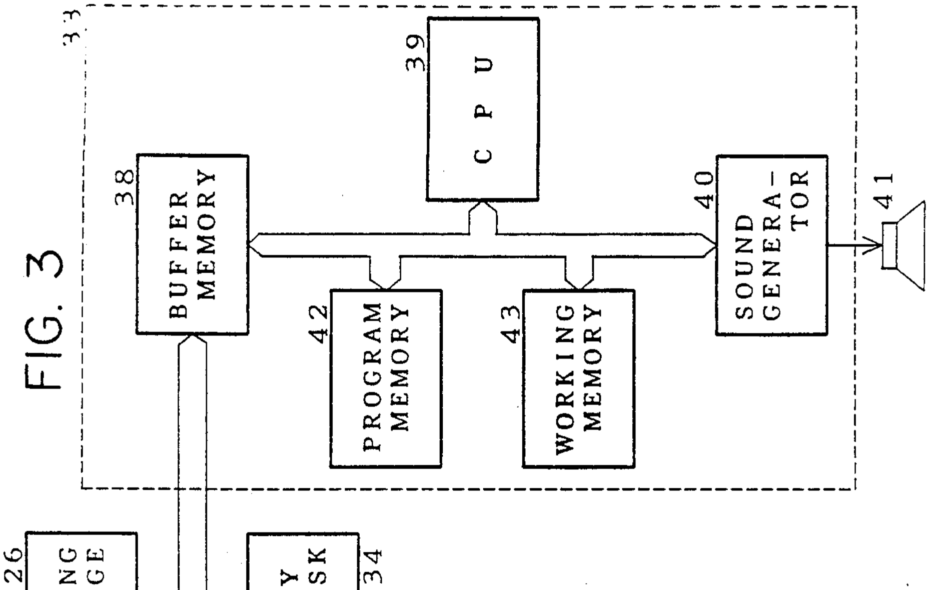
FIG. 3 is a schematic block diagram showing the entire construction of a performance information processing system of the present invention.
Figure 3:
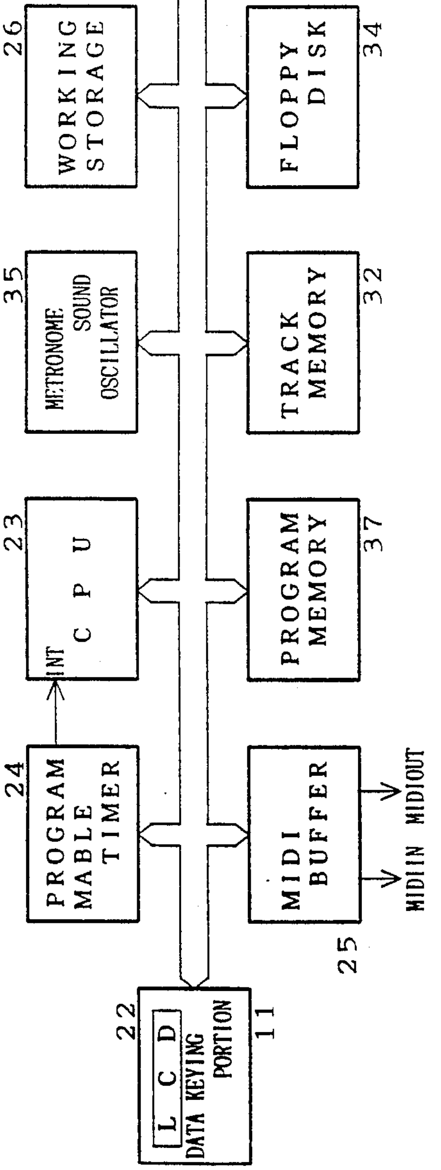

FIG. 3 showns the overall construction of a Musical Instrument Digital Interface (MIDI) sequencer used in the present invention. Note, the MIDI specification is a known software language and hardware interconnection scheme for communication between computers and computer-controlled devices such as synthesizers. As shown in this figure, the sequencer includes a data keying portion 11 operated by a user to set a value of the tempo, a general purpose CPU 23 provided to appropriately determine both the regular time interval between the successive interruptions thereat and the value of an increment used to increment the content of a tempo register according to the set value of the tempo, and a programmable timer 24 used to store the value of a count corresponding to the determined time interval and output interrupt signals to the CPU 23.

The elements composing the MIDI sequencer of the present invention will now be described in detail.

1.1 CONSTRUCTION OF DATA KEYING PORTION 11

Figure 4:
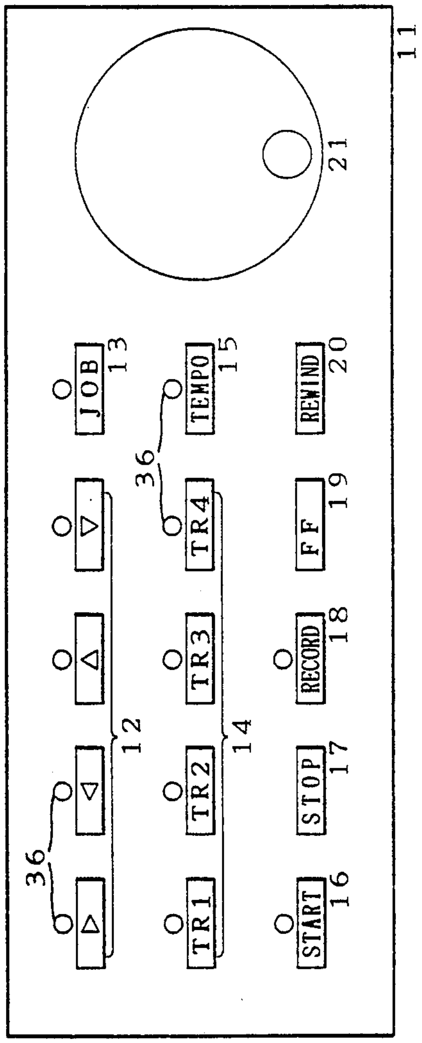
FIG. 4 is a diagram showing a data keying portion of the system of FIG. 3.

The data keying portion 11 of this sequencer, as shown in FIG. 4, is provided with cursor keys 12, a job key 13, track keys 14, a tempo key 15, a start key 16, a stop key 17, a record key 18, a fast forward key 19, a rewind key 20, and an incrementer 21.

The cursor keys 12 are used for moving a cursor on a screen of a liquid crystal display (hereunder referred to as LCD) up, down, left, and right. The job key 13 is provided for choosing between a basic mode of effecting the process of recording and playing back performance data on tracks, the process including setting timbre and loudness level parameters and so forth; and a job mode of effecting various processes of editing data and interfacing with a floppy disk and so on, and for switching from one to the other of these modes. The track key 14 is used for selecting one of tracks 1 to 4 in which the performance data is stored. The tempo key 15 is provided for issuing instructions for playing a piece of music at a tempo recorded track. The start key 16 is used for commencing the recording/playback of the performance data and starting various other functions, and the stopping key 17 is used for stopping the recording/playback of performance data and other functions. The record key 18 is used for holding the recording of the performance data on a track. The fast forward key 19 is used to fast feed recorded performance data of bars to be performed and the rewind key 20 is used for a fast rewind of the recorded data of the bars. If the keys 19 and 20 are both pressed down at the same time, the process of accessing the bars of the piece of music returns to a top bar of recorded bars to be accessed. The incrementer 21 is used to change the value of each of the parameters, such as the tempo, indicated by the cursor on an LCD display 22.

1.2 OUTLINE OF ENTIRE CONSTRUCTION OF CIRCUIT

Figure 5:
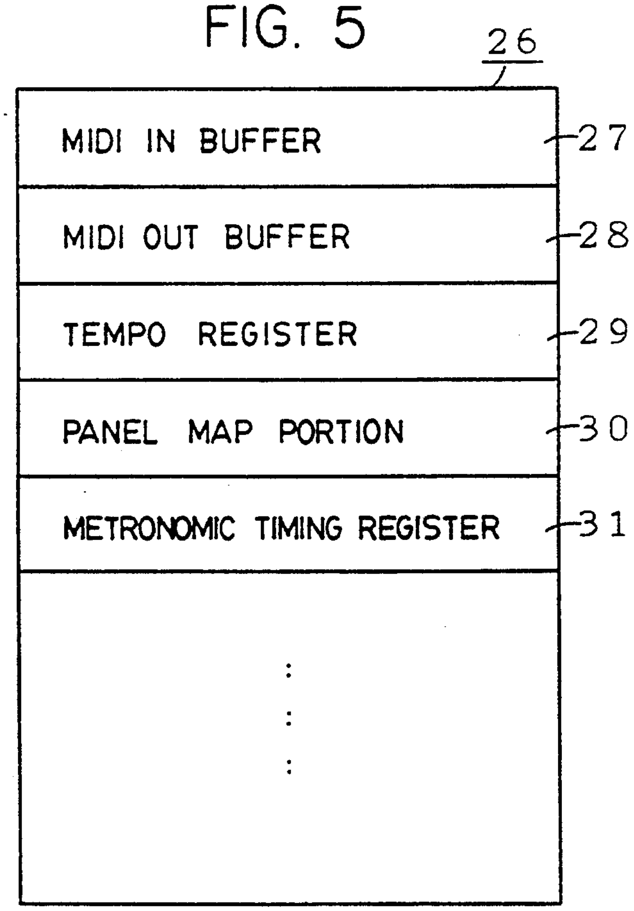
FIG. 5 is a diagram showing the structure of a working storage of the system of FIG. 3.

The value of the count corresponding to the time interval between the successive interruptions of the CPU 23 is set by the CPU 23 in the programmable timer 24, on the basis of the value of the tempo set by the data keying portion 11. This value of the count is determined as follows:

$$(a \times 60)/(W \times 24 \times b) \quad (1)$$

where W indicates the number of quarter-note to be performed per minute, and represents the tempo at which the piece of music is to be played. Further, in the equation (1), a indicates a constant having a value which is determined by the standard of the programmable timer 24 and is set such that an interruption signal having the period as shown in FIG. 1(B) is output from the programmable timer 24, and b indicates control data for controlling the time interval corresponding to the tempo and indicating by how many times the length of the time interval exceeds the period of a MIDI clock pulse. This control data b is set as 16 where $25 \leqq W < 50$ (hereunder referred to as a first tempo range); 8 where $50 \leqq W < 100$ (hereunder referred to as a second tempo range); 4 where $100 \leqq W < 200$ (hereunder referred to as a third tempo range); and 2 where $200 \leqq W < 400$ (hereunder referred to as a fourth tempo range). Further, 60 in the numerator of the above equation (1) indicates the number of seconds of a minute, and 24 in a denominator thereof indicates the number of MIDI clock pulses per quarter-note required to synchronize the sequencer with the MIDI musical instrument; i.e., 24 MIDI clock pulses are issued per quarter-note. A part of the equation (1) excepting the constant a has the value of the time interval as shown in FIG. 1(B), and therefore as the range of the value of the tempo is changed from the first tempo range to the second tempo range, and further to the third tempo range, and still further to the fourth tempo range, the value of the above described part is changed to $\frac{1}{2}$, and further to $\frac{1}{4}$, and still further to $\frac{1}{8}$. Accordingly, the time interval between the successive interruptions is limited within a constant range covering 3.28 (msec) and 6.25 (msec). Interruption signals are supplied from the programmable timer 24 at the time interval between the successive interruptions corresponding to the value of the count set by the timer 24 to the CPU 23 by which the interruption processing required for controlling the tempo at which a piece of music is to be played, for example, the process of incrementing the content of the tempo register 29, of the working storage 26 as shown in FIG. 5, and scanning the state of the keys and the switches, is effected.

As shown in FIG. 3, MIDI performance information fed from the external MIDI musical instrument connected to the sequencer by an input terminal "MIDI IN" and a MIDI buffer 25 is temporarily stored in a MIDI IN buffer of a working storage 26 and is also sent to a track memory 32 and recorded therein. Further, the MIDI performance information is sent to a sound-generating module 33 to generate sound. Similarly, other performance information recorded in the track memory 32 is transferred to a sound-generating module 33 to generate sound and is temporarily stored in a MIDI OUT buffer 28 of the working storage 26, and is output from an output terminal "MIDI OUT" through the MIDI buffer 25 as MIDI performance information to the external musical instrument. Further, the performance data recorded on the track memory 32 is saved in a floppy disk 34 or is loaded from the floppy disk 34 to the track memory 32.

When a metronomic sound oscillator 35 becomes active, metronomic sound signals are generated having a pattern corresponding to the content set in a metronomic timing register 31 of the working storage 26, and are sent to the sound-generating module 33 to output a metronomic sound. The content of the operation effected by the data keying portion 11 is scanned by the CPU 23 and stored in a panel map portion 30 of the working storage 26, whereby LED lamps 36 on the panel are turned on and various information is displayed at the LCD display portion 22. Further, programs to be executed by the CPU 23 to effect various processes are stored in a memory for storing programs (hereunder referred to as a program memory) 37, and various intermediate data are similarly stored in the working storage 26. In addition, the performance information sent to the sound-generating module 33 is read out by a local processing unit 39, after being temporarily stored in a buffer memory 38. Thereafter, the performance information is sent to a sound generator 40 whereupon musical sound signals are produced and the corresponding musical sounds are output from a speaker 41. Note, programs to be executed by the local processing unit 39 for performing various processes are stored in a program memory 42, and various intermediate data is stored in a working storage 43.

1.3 STRUCTURE OF WORKING STORAGE 26

Figures 6, 7:
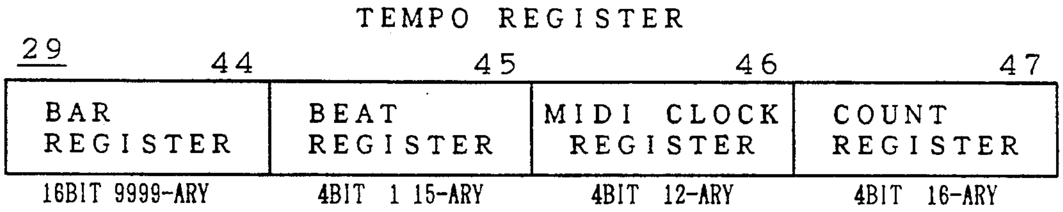
FIG. 6 is a diagram showing the structure of a tempo register employed in the system of FIG. 3.
FIG. 7 is a diagram showing the relationship between the beats displayed at a panel of the system of FIG. 3 and the beats internally processed in the system thereof.

FIG. 5 shows the structure of the working storage 26 provided in a main part of the sequencer. The tempo register 29 of this working storage 26 is used to control the tempo at which a piece of music is played and is composed of a bar register 44, a beat register 45, a MIDI clock register 46, and a count register 47 as shown in FIG. 6. The counter register 47 is a 4-bit hexadecimal counter, and each time this counter overflows, the content of the MIDI clock register 46 is incremented by 1.

The MIDI clock register 46 is a 4-bit duodecimal (12-ary) counter and responds to MIDI clock pulses for synchronizing the MIDI musical instruments with each other, and each time this counter overflows, the content of the beat register 45 is incremented by 1. The beat register 45 is a 4-bit N-ary counter (here, N is a natural number and satisfies a condition $2 \leqq n \leqq 15$) for counting the number of beats which is used to represent the preset value of the tempo, and each time this counter overflows, the content of the bar register 44 is incremented by 1. The bar register 44 is a 16-bit 9999-ary counter for counting the number of bars played by the musical instrument.

The content of this tempo register 29 is incremented by the CPU 23 each time an interruption signal is output by the programmable timer 24 to the CPU 23. The period of the interruption signal output from the programmable timer 24 does not always correspond to the tempo set as a value shown in FIG. 1(B), because the period of the interruption signal from the timer 24 is within the same range of 3.28 (msec) and 6.25 (msec) thereof if the value of the tempo W is in any one of the first, second, third, and fourth tempo ranges. To make the actual speed at which the piece of music is performed by this embodiment correspond appropriately to the pre-set value of the tempo, the increment for incrementing the tempo register 29 is doubled, quadrupled or further increased eightfold as the tempo is changed from the value in the first tempo range to another value in the second, third or fourth tempo range.

FIG. 7 shows the relationship between the rhythm to be selected for playing a piece of music and the corresponding rhythm data to be processed in the sequencer. Further, in the beat register, which is a N-ary counter as stated above, it is determined in accordance with this figure which number of the numeral N is to be selected from the integers from 2 to 15. As shown in this figure, the value indicating the set rhythm is converted into data in the form of N/8 indicating N eight-notes per bar. The N-ary employed in the beat register is determined in accordance with this value of the denominator N of the converted data. For example, if the rhythm set by a player or user is $\frac{3}{4}$, the converted data of the beat is 6/8, and as a result, the beat register 45 is constructed as a 6-ary counter.

Figures 8, 9, 13:
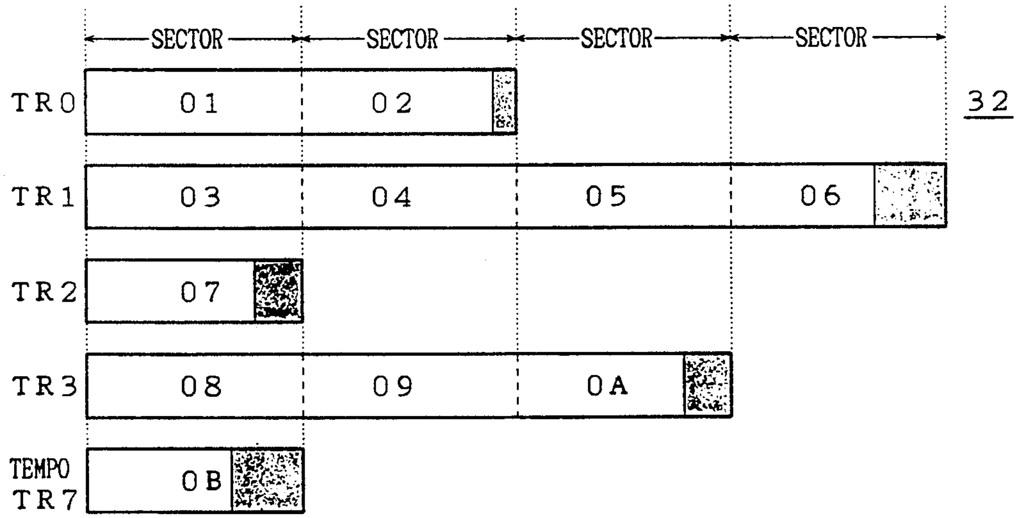

FIGS. 8 and 9 show parts of the content of the panel map portion 30 in which an "ON" (corresponding to "1") or "OFF" (corresponding to "0") state of each of the keys 12–21 of the data keying portion 11 is stored at each bit. If the incrementer 21 is turned in the direction corresponding to an incrementing of a quantity such as the value of the tempo, "1" is set at an INCM (+) flag bit, and conversely if the incrementer 21 is turned in the direction corresponding to a decrementing of the quantity, 1 is set at an INCM (−) flag bit. As shown in FIG. 9, the turned-on state (corresponding to "1") and the turned-off state (corresponding to "0") of LED lamps 36 on the panel provided on the data keying portion 11 in a portion above the keys, are stored at each corresponding bit. LED lamps 36 corresponding to the stop key 17, the fast forward key 19, the rewind key 20, and the incrementer 21 are not provided thereon. Further, the LED lamp 36 corresponding to the job key 13 is turned on in the job mode and is turned off in the basic mode.

1.4 CONTENT OF LCD DISPLAY PORTION 22

FIGS. 10 and 11 show the content displayed by the LCD display portion 22 in the basic mode and in the job mode, respectively. In the basic mode shown in FIG. 10, the numeral displayed at the top left portion in the LCD display portion 22, as viewed in this figure, is the number of a piece of music being played. The system of FIG. 3 stores performance information for a maximum of 8 pieces of music. The number of the piece of music to be displayed is changed by the incrementer 21 from "1" through "8". Further, at the same time, the name of the piece of music, the number of which is currently displayed, is also displayed. In the figure, the name "SONG2" of a piece of music having the number 2, is displayed. The names of songs stored in the system are reset by a "DS-SAVE" process, as described hereunder, in the job mode. A numeral "120" displayed to the right of the center of the display portion and alongside a quarter-note symbol, as viewed in this figure, indicates the tempo at which the piece of music is being played. The tempo can be set by the incrementer 21 over a range of from 50 to 400. The set value of the tempo is recorded by turning on the tempo key 15 on a tempo track, as described hereinbelow. Further, the data "4/4" relating to the rhythm is displayed below the tempo, as viewed in the figure. The rhythm can be set by the incrementer 21, as shown in FIG. 7. Furthermore, the larger-size numerals "15" displayed on the right of the beat data indicate the number of bars currently recorded or played back, and can be varied from "0001" to "9999". A smaller-size numeral "3" contiguous to the number of bars indicates the current beat value. For example, in the case of "4/4", numerals 1, 2, 3 and 4 are repeatedly displayed thereon, in that order, and in the case of "6/8", numerals 1, 2, 3, 4, 5 and 6 are repeatedly displayed thereon, in that order. When each track of the track memory 32 is in the playback mode, the number of bars and the number of beats are changed by moving the cursor to the positions at which they are displayed and operating the incrementer 21. At that time, the content of the performance data recorded on each track corresponding to the resultant number of bars and number of beats is displayed on the LCD display portion 22, and at the same time, set in the sound-generating module 33. Additionally, the FIG. "98%" displayed at the top right corner of the display portion 22, indicates the amount available of the track memory 32.

In the lower half of the LCD display portion 22 as shown in FIG. 10, the values of various parameters T, KT, ASN, VRI, VOL, SUS, TCH, TVB, POR, OCT, PIT, ENDBAR, and EXP.PEDAL are displayed. First, the track parameter T has the values 1, 2, 3 and 4 each indicating a different track of four tracks of the track memory 32. The other parameters are set to each of the four tracks.

A channel converter parameter KT is a combination of a key board subparameter k indicating a means for inputting the performance data related to the content of a piece of music to be played, and a tablet subparameter t indicating a means for inputting data of a timbre, the volume of a sound, and effects etc. The incrementer 21 selects these means from an upper keyboard represented by "U", a lower keyboard represented by "L", a pedal keyboard represented by "P", a solo keyboard represented by "S". Namely, 16 pairs of these means are provided as shown in FIG. 12.

A sound-emitting-mode assigning parameter ASN indicates the manner of assigning sound emitting channels to sounds which are polyphony and/or monophony. In FIG. 10, capitals P and M denote polyphony and monophony, respectively, and the switch from polyphony to monophony, and vice versa, is made by using the incrementer 21.

A timbre parameter VOICE NAME indicates a timbre assigned to the sounds of the piece of music to be played. As shown in FIG. 12, 64 timbres can be selected by using the incrementer 21.

A variation parameter VRI indicates whether any variation of tones is made. The incrementer 21 switches between an on-state (represented by "1" in FIG. 10), in which the variation of tones is made, and an off-state (represented by "−" in FIG. 10), in which the variation of tones is not made.

A volume parameter VOL indicates the loudness level or volume of a sound, and is changed by the incrementer 21 over a range of 1.0 to 7.0, at intervals of 0.5.

A sustain parameter SUS indicates the length of a period for which a sustain level is held. As shown in FIG. 12, first, second, third and fourth levels of the length of a period for which the sustain level is held are provided classified according to the value of this parameter. In a first level indicated by "−" in FIG. 10, the sustain is not effected, and thus the length of the period for which the sustain level is held is 0. The other three levels, in which the lengths of the period for which the sustain level is held are 1, 2 and 3, respectively, are discriminated by "1", "2" and "3" in FIG. 10, and these levels are switched by the incrementer 21.

A touch parameter TCH indicates whether or not the loudness level and the timbre are to be changed on the basis of the magnitude of the pressure of a finger on the keys (or the speed of at which the keys are touched). Further, the incrementer 21 switches between an on-state (indicated by "1" in FIG. 10) in which the loudness level and the timbre are changed, and an off-state (indicated by "−" in FIG. 10) in which the loudness level and the timbre are not changed.

A vibrato parameter TVB indicates whether or not the extent of the vibrato (i.e., the width and frequency of a frequency-modulated signal) is to be changed on the basis of the magnitude of the pressure of a finger on the keys. As in the case of the TCH, the incrementer 21 switches between an on-state (indicated by "1" in FIG. 10) of the system in which a change of the vibrato is effected, and an off-state (indicated by "−" in FIG. 10) thereof in which such a change is not effected.

A portamento parameter POR indicates the rate or speed of a portamento operation, i.e., the rate of a smooth or continuous move from one tone to another tone. In FIG. 12, characters "−", "1", "2", and "3" indicate that the rate or speed of a portmento operation is off or not changed, slow, ordinary, and fast, respectively. An octave rising or dropping parameter OCT indicates whether or not a tone is to be changed, i.e., a tone is to be raised by an octave or dropped by an octave. The value of this parameter is changed by using the incrementer 21, as shown in FIG. 12. In FIG. 10, characters "U", "D", and "−" indicate that a tone is to be raised by one octave, that a tone is to be dropped by one octave, and that a tone is not to be changed, respectively.

A pitch rising and dropping parameter PIT indicates whether or not a scale is to be changed, i.e., is to be raised 100 percent higher or dropped 100 percent lower. In FIG. 12, characters "U", "D", and "−" indicate that the scale is to be raised by 100 percent, that the scale is to be dropped by 100 percent, and that the scale is not to be changed, respectively. The value of this parameter is changed by using the incrementer 21.

An end bar parameter END BAR denotes the location of data corresponding to the end bar of a piece of music recorded on each track.

An expression pedal parameter EXP.PEDAL indicates the value of data input by using an expression pedal, which is a volume controller connected to the body of the sequencer, recorded on each track of the track memory 32 and output therefrom to the sound-generating module 33. When the data recorded on the track is being played back, the number of times of use of the expression pedal recorded on the track is displayed on the LCD display portion 22. On the other hand, when the track is not being reproduced, the number of times of current use of the expression pedal by a player or user is displayed thereon.

In the job mode, abbreviations representing the following 16 processes to be effected are displayed on the LCD display portion 22: DS-LOAD; DS-SAVE; DS-DELETE; DS-FORMAT; TR-ERASE; TR-COPY; TR-DELETE; TR-INSERT; TR-MERGE; TR-EXCHNG; QUANTIZE; PUNCH-IN; VOICE-LST; FILTER; SYSTEM; and EO-SET.

The process DS-LOAD is used for loading the track memory with the data of a piece of music stored in the floppy disk 34.

The process DS-SAVE comprises the steps of naming the data of the piece of music stored in the track memory and saving this named data to the floppy disk 34, and the process DS-DELETE is used for deleting the data of a piece of music, which is no longer required, from the floppy 34.

The process DS-FORMAT is used for formatting or initializing the floppy 34.

The process TR-ERASE comprises the steps of selecting data corresponding to a certain range of bars stored on a specific track and deleting only the selected data.

The process TR-COPY comprises the steps of selecting a certain range of data of bars on a specified track, indicating certain locations to which data of bars is stored on the same track or another track, which may be an empty track, and copying the selected data onto the indicated locations.

The process TR-DELETE comprises the steps of selecting a range of data of bars stored on a specific track and deleting the selected range of data from that track.

The process TR-INSERT comprises the steps of selecting a certain range of data of bars on a specified track, indicating a certain location on the same track or another track, and inserting the selected data to the indicated location.

The process TR-MERGE comprises the steps of selecting certain ranges of data of bars on a specified track, indicating certain locations on the same track or another track, and merging the selected ranges of data at the indicated locations.

The process TR-EXCHNG comprises the steps of selecting two tracks, indicating the number of bars of which data is stored on the selected tracks, and exchanging the content of the data of the indicated bars stored on the selected tracks with other data.

The process QUANTIZE comprises the steps of indicating a note of a piece of music, selecting a range of bars of which data is recorded or stored on a track, and adjusting a timing of the performance of a note at a top or initial one of the locations of data corresponding to the selected range of bars with an appropriate timing of the performance of the indicated note of the piece of music.

The process PUNCH-IN is used for modifying a part of data recorded on a track.

The process VOICE-LST used for displaying all of the timbres.

The process FILTER comprises the steps of indicating specific MIDI performance data of a piece of music stored on each track and deleting the indicated data when recording the piece of music or suppressing the emission of sounds corresponding to the indicated data when reperforming the piece of music.

The process SYSTEM is used for setting parameters which are common to all of the tracks.

The process EO-SET is used for performing the initialization of the sequencer for setting the timbres and the loudness level by using external MIDI musical instruments connected thereto.

1.5 CONSTRUCTION OF TRACK MEMORY 32

FIGS. 13 through 15 show the content stored in the track memory 32 in which 5 tracks, i.e., tracks 0, 1, 2 and 3 (corresponding to Nos., 1, 2, 3 and 4 of tracks displayed at the LCD display portion 22) and the tempo track are formed, and the sectors of the number corresponding to the quantity of each track used for recording a piece of music.

In FIG. 13, shaded parts of sectors are empty portions in which no data or information is stored.

FIG. 14 shows the format of a sector managing area for which a storage region of 16-bit $40_H$ addresses or locations (hereunder, the character $_H$ added to a number means that the number is a hexadecimal number) is allocated. An area located at address 0 is used for interfacing with the floppy disk 34. Further, the number of a sector next to a current sector, data for indicating whether or not a sector is to be used, the number of a piece of music to be played and that of a track are stored at areas located at larger addresses 1 . . . .

Next, FIG. 15 shows an example of the content of the sector managing area corresponding to the patterns of tracks shown in FIG. 13. The sector "$01_H$" at the address 1 includes a part of bits 8 to 15 indicating that the number of a sector to be next read is "02H", a bit 7 indicating that the sector "01H" is used, and another bit 6 indicating that number of a track to which the sector "$01_H$" belongs is 0. This is similar to the other tracks. Further, if the number of the sector to be next read is "$00_H$", this indicates that the current sector is the end of the track, and if a second half of an area at a certain address, i.e., an area of bits 0–7, is "$00_H$", this indicates that this sector is unused.

Hereinafter, the operation of this embodiment will be described in detail with reference to FIGS. 16 through 19.

2.1 PROCESS OF SETTING PROGRAMMABLE TIMER 24

Figure 16:
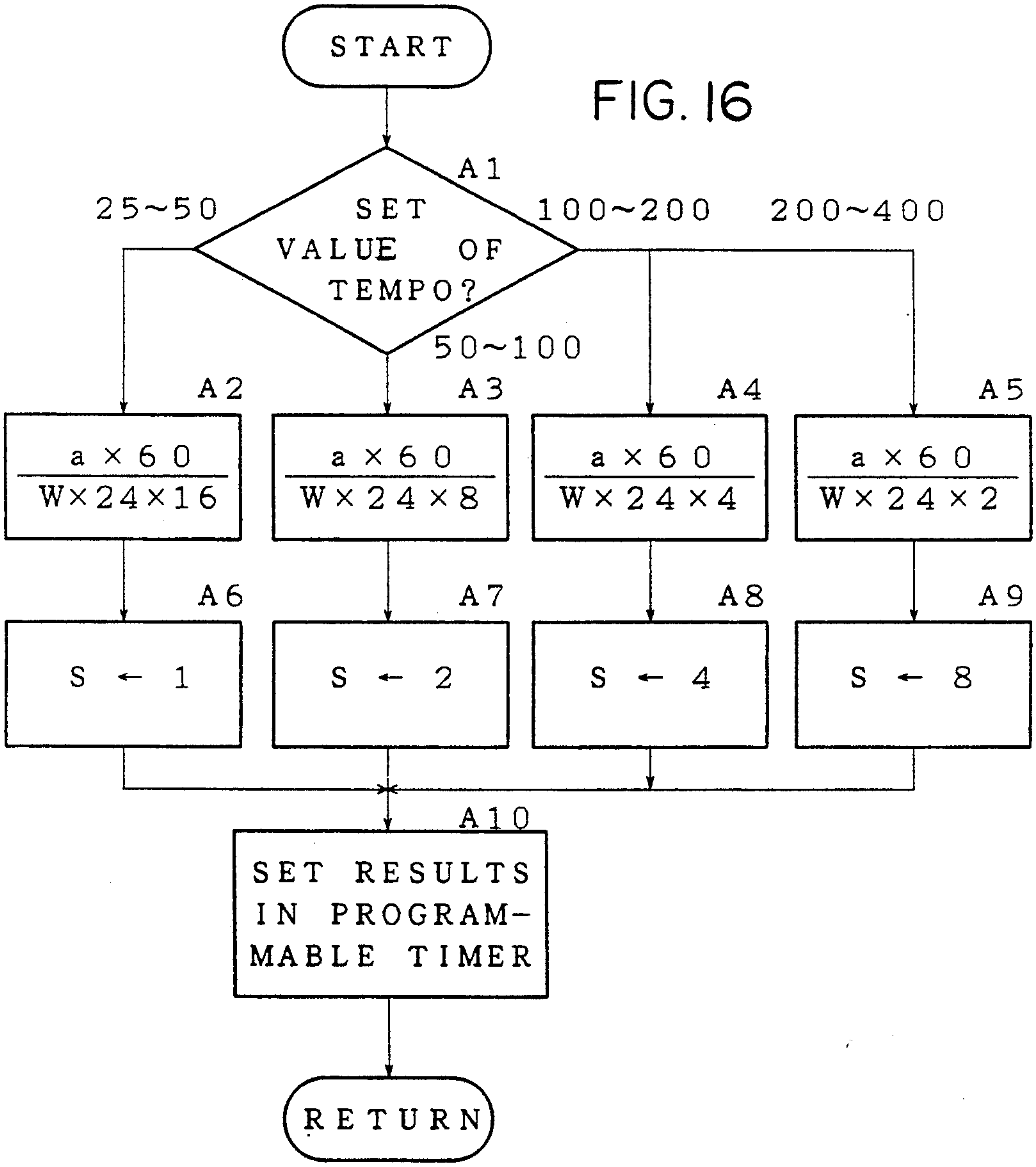
FIG. 16 is a flowchart explaining the process of setting a programmable timer of the system of FIG. 3.

FIG. 16 is a flowchart explaining a process of setting the programmable timer 24. This process is effected by executing one of subroutines for recording and reproducing data on a track which are called by a main routine, as described hereinafter. First, at step A1, the CPU 23 determines the value W used to represent the tempo set by the tempo key 15 of the data keying portion 11. The CPU 23 then calculates the value of the count to be set to the programmable timer 24 on the basis of the value W, as follows: if the value W is in the first tempo range ($25 \leqq W < 50$), the CPU 23 calculates $(a \times 60)/(W \times 24 \times 16)$ at step A2; if in the second tempo range ($50 \leqq W < 100$), the CPU 23 calculates $(a \times 60)/(W \times 24 \times 8)$ at step A3; if in the second tempo range ($100 \leqq W < 200$), the CPU 23 calculates $(a \times 60)/(W \times 24 \times 4)$ at step A4; and if in the fourth tempo range ($200 \leqq W < 400$), the CPU 23 calculates $(a \times 60)/(W \times 24 \times 2)$ at step A5.

Figure 1A:
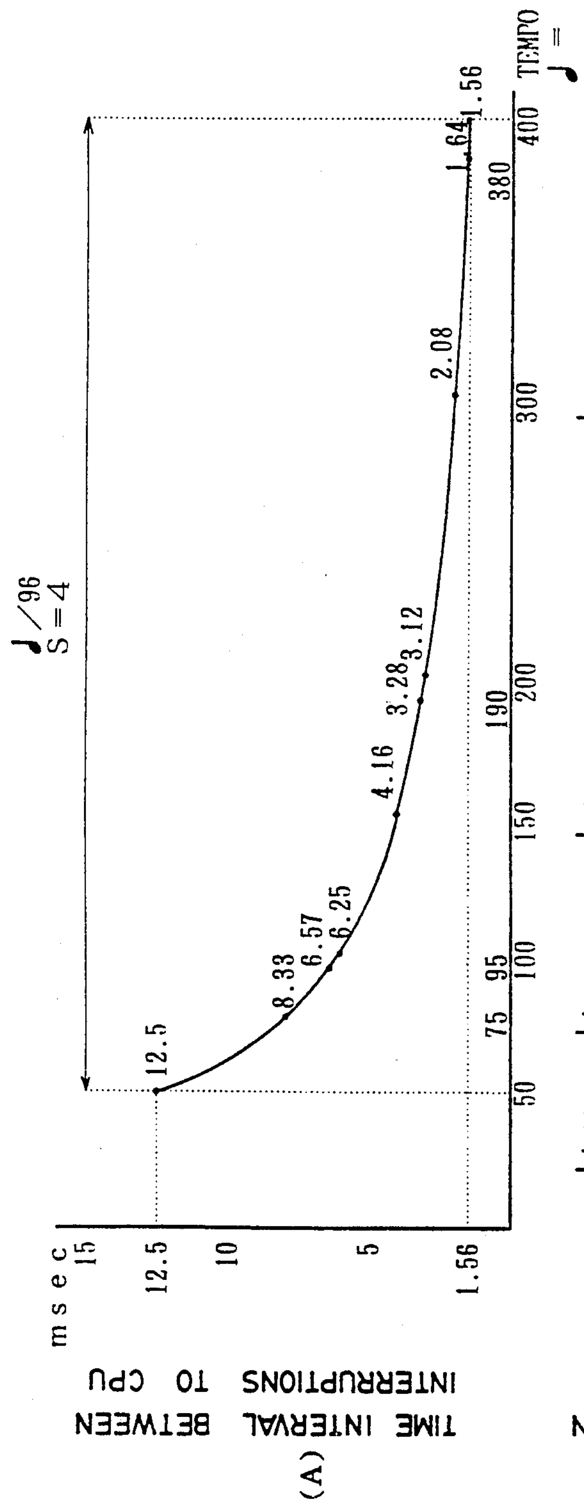
FIGS. 1(A) and 1(B) are graphs showing the relationship between the pre-set value of the tempo of performance of a piece of music and the range of the period of the interruption of a CPU in the case of a conventional electronic musical instrument and in the case of the present invention, respectively.
Figure 1B:
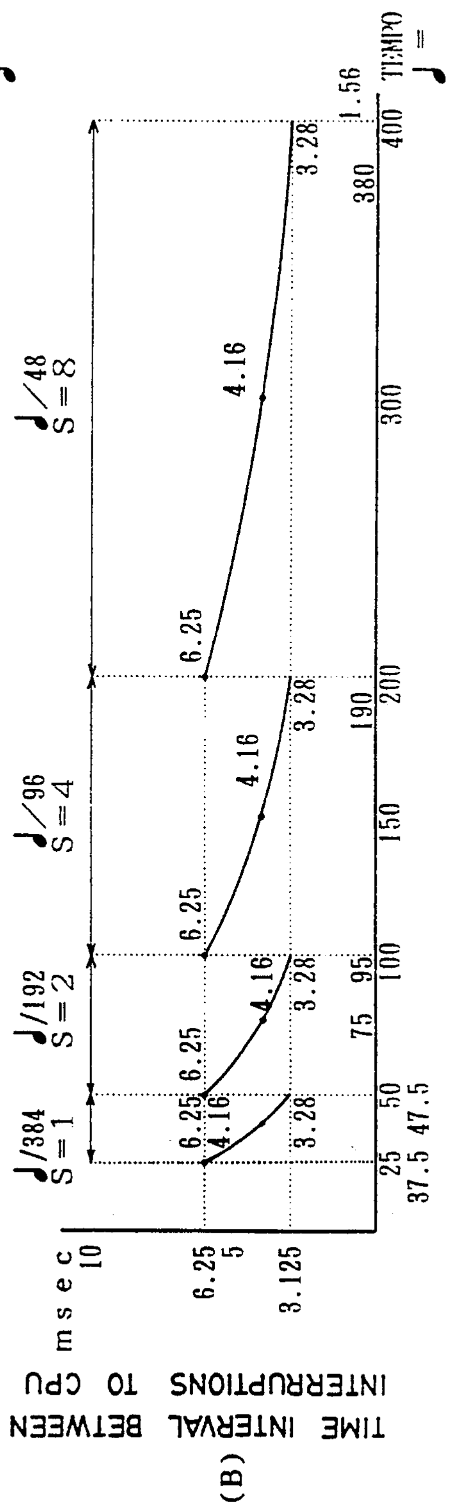
Figure 2:
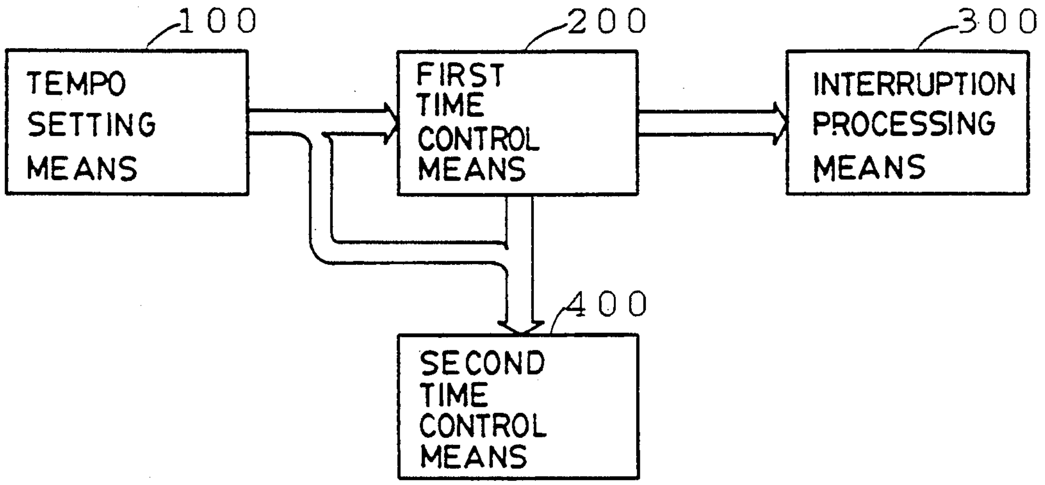
FIG. 2 is a schematic block diagram showing the construction of an interruption control apparatus according to the present invention.

As described above, the value of the part of each of these equations excepting the constant a is equal to that of the time interval between the successive interruptions, as shown in FIG. 1 (B). Therefore, if the value W is doubled, quadrupled or brought to eightfold value thereof, i.e., the value W in the first tempo range is changed to that in the second, third or fourth tempo range, the time interval between the successive interruptions is changed to a half, a fourth or an eighth thereof, and thus the value of the time interval between the successive interruptions (hereunder referred to as the time interval between the interruptions) is limited to a constant of from covering 3.28 (msec) to 6.25 (msec).

Accordingly, the time interval of the interruptions of the CPU 23 cannot exceed the performance or capability of the CPU 23, and further, the time interval between the interruptions of the CPU 23 cannot be so small that the capability of the CPU 23 cannot be effectively utilized and thus a loss of the utility of the circuits of the system occurs. Therefore, in accordance with the present invention, the value of the time interval between the interruptions of the CPU 23 can be made a value most appropriate to the capability of the CPU 23, and thus, the performance information can be smoothly processed in the system.

Thereafter, the CPU 23 determines the value of the increment S used in the tempo register 29, as follows: if the value W is in the first tempo range ($25 \leqq W < 50$), the increment S is set as 1 at step A6; if in the second tempo range ($50 \leqq W < 100$), the increment S is set as 2 at step A7; if in the third tempo range ($100 \leqq W < 200$), the increment S is set as 4 at step A8; and if in the fourth tempo range ($200 \leqq W < 400$), the increment S is set as 8 at step A9. Further, the thus determined value of the increment S is temporarily stored in the working storage 26 at step A6, A7, A8, or A9, and the program then proceeds to step A10 at which the value of the count for determining the time interval between the interruptions as calculated at step A2, A3, A4, or A5 is set in the programmable timer 24.

2.2 PROCESS OF CONTROLLING TEMPO OF PLAYING PIECE OF MUSIC

Figure 17:
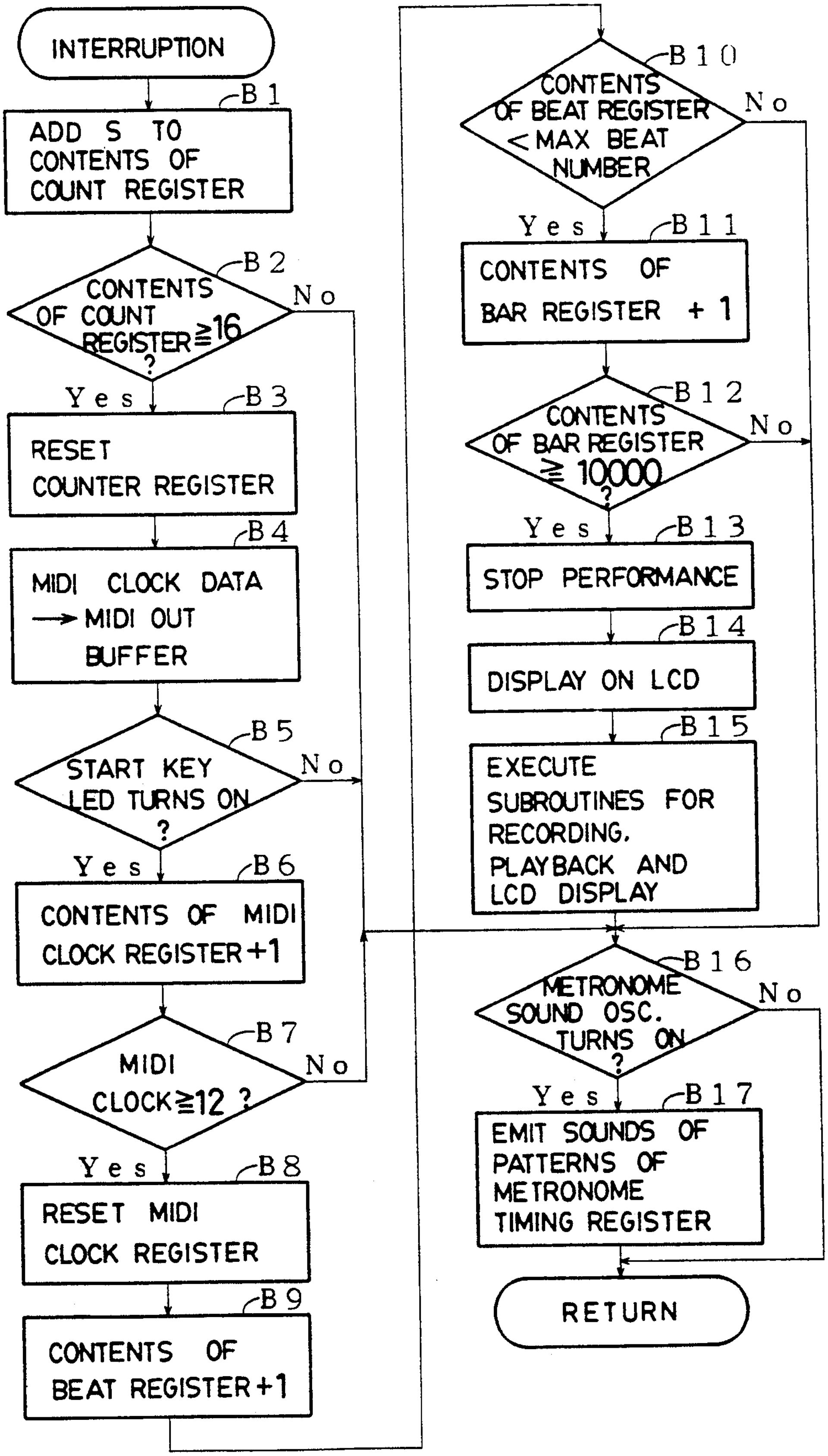
FIG. 17 is a flowchart explaining the process of controlling the tempo of a performance of a piece of music in the system of FIG. 3.

FIG. 17 is a flowchart explaining the process of controlling the tempo of playing a piece of music. This process is carried out on the basis of interruption signals output by the programmable timer 24, by employing the value of the time interval between the interruptions corresponding to the set value of the tempo as shown in FIG. 1(B). Namely, the CPU 23 adds the value of the increment S obtained at step A6, A7, A8, or A9 of the above described process of setting the programmable timer 24 to data stored in the count register 47 of the tempo register 29 provided in the working storage 26 at step B1.

Thereby, although the value of the count set in the programmable timer 24 is limited within the same range independently from the set value of the tempo W, the time interval between the interruptions to the CPU 23 caused by the interruption signal from the programmable timer 24, and as a result, the value of the count in the tempo register 29, appropriately corresponds to the set value of the tempo W because the value of the increment S is appropriately selected from the values 1, 2, 4, and 8 as described above.

Next, the program enters step B2, at which it is determined whether or not the content of the count register 47 has reached 16. If the content of the register 47 has reached 16, the count register 47 is reset as "$00_H$" at step B3 and the value of the MIDI clock register 46 is transferred to the MIDI OUT buffer 28. Thereafter, at step B5, it is determined whether or not the LED lamp 36 corresponding to the starting key is turned on, based on the content of the panel map portion 30. If the lamp 36 is turned on, the MIDI clock register 46 is incremented by 1 at step B6. Then, at step B7, it is determined whether or not the content of the MIDI clock register 46 has reached 12. If the content has reached 12 the MIDI clock register 46 is cleared at step B8 and the beat register 45 is incremented by 1 at step B9. The program then advances to step B10 at which the CPU 23 determines whether or not the value of the beat register 45 exceeds the predetermined maximum number MB of the beats; if no, the bar register 44 is incremented by 1 at step B11. Then, at step B12, it is determined whether or not the content of the bar register 44 exceeds "10000"; if yes, the program advances to step B13 at which the performance of a piece of music is stopped, and this stoppage, is displayed at the LCD display portion 22 at step B14. Thereafter, at step B15, the processes of executing the subroutines for recording data on a track, reproducing data from the track, displaying data from the track, and displaying data on the LCD display portion 22 are effected. Then, at step B16, it is determined whether or not the metronomic sound oscillator 35 is turned on. If the oscillator 35 is turned on, a metronomic signal representing a pattern corresponding to the content of the metronomic timing register 31 is produced, and the corresponding sound is then output at a step B17.

2.3 OUTLINE OF PROCESSING BY OVERALL SYSTEM

Figure 18:
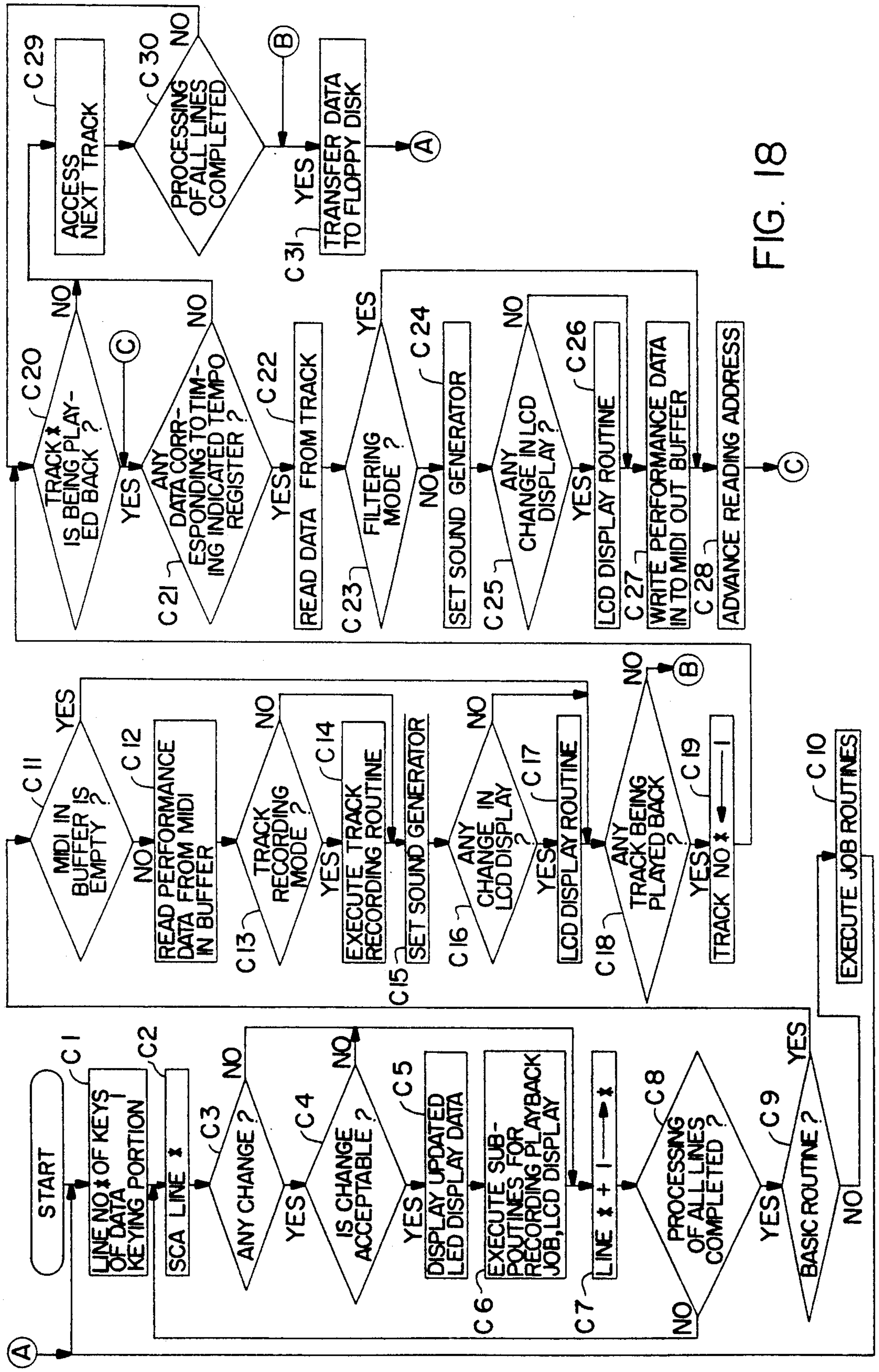
FIG. 18 is a flowchart explaining the processing effected by executing a main routine in the system of FIG. 3.

FIG. 18 is a flowchart explaining the main routine. As shown in FIG. 18, the CPU 23 commence the processing after the power supply is switched on, i.e., the CPU 23 scans the keys, which are provided in a first line and indicated at step C1, of the data keying portion 11 at step C2 and determines whether or not there is any change in the status of the scanned keys by comparing the current statuses with those stored in the panel map portion 30, at step C3. If there is any change at step C4, the CPU 23 determines whether or not the change is acceptable. If acceptable, the data of the state of the display of the LED lamps 36 is updated and further data corresponding to this updating is displayed by the LED lamps 36 at the panel at step C5. Further, at step C6, the processes of executing the subroutines for recording data on a track, reproducing data from the track, and displaying data on the LCD display portion 22 are effected, and thereafter, the processes of scanning the keys provided in the next line and updating the display by the LED lamps 36 on the panel are similarly effected. These processes are repeatedly effected with respect to the keys provided on each of the remaining lines of the portion 11 until it is verified at step C8 that all of these processes are completed for all of the lines of the keys of the data keying portion 11.

Next, the program enters step C9, whereupon the CPU 23 determines whether the system is now in the normal or fundamental mode. If no, the CPU 23 effects the processing corresponding to the job mode at step C10, and upon completion of that processing, the program returns to step C1. On the other hand, if the system is in the basic mode, it is determined at step C11 whether or not the MIDI IN buffer 27 of the working storage 26 is empty. Further, at step C12, MIDI performance data is input to the MIDI IN buffer 27 from the external MIDI musical instrument connected thereto, and if the MIDI IN buffer 27 is not empty, the performance data is read out of the MIDI IN buffer 27. Thereafter, at step C13, it is determined whether or not the system is in a recording mode of recording data onto a track. If the system is in the recording mode, the CPU 23 executes a subroutine for recording data on a track, to record the performance data on a track of the track memory 32 in step C14, and further, the performance data is sent to the sound generator 40 to generate the sound at step C15. The program then enters step C16, whereupon the content of the data displayed at the LCD displaying portion 22 is compared with the content of the data stored in the panel map portion 30, to determine whether there is any change in the content of the data due to a change in the operation of the keys of the data keying portion 11. If there is any change, the subroutine for effecting a display at the LCD display portion 22 is executed in step C17.

The program than advances to step C18, where it is determined whether or not the system is in the playback mode. If the system is in the playback mode, a track from which the data is being played back is searched at steps C19, C20, C29, and C30. If such a track exists, it is determined at step C21, by comparing the current time indicated by the tempo register 29 of the working storage 26 with the value of the count or address corresponding to each unit of the recorded performance data in the track, whether there is any performance data to be read out from the track at the time indicated by the tempo register 29. If such performance data exists, data is read out from the track at step C22. Note, the faster the pre-set tempo, the greater the frequency of reading such performance data.

Next, at step C23, The CPU 23 determines whether or not a filtering mode of omitting specific performance data is employed by the system. If such a mode is not employed, at step C24, the performance data is sent to the sound generator 40 to generate sounds, and thereafter, at step C25, the content of data displayed at the LCD display portion 22 is compared with the content stored in the panel map portion 30 to determine whether any change in the displayed data has occurred due to operation of the keys of the data keying portion 11. If there is any change in the content of the data display at the LCD displaying portion 22, the subroutine for display data at the LCD displaying portion 22 is carried out at step C26, and further, the performance data is set in the MIDI OUT buffer 28 at step C27. Conversely, if the filtering mode is not employed, the processing effected at steps C24 to C27 is not performed, and thus the above described playback process composed of steps C21 to C27 is similarly effected over the whole of the track by incrementing, at step C28, the address of data to be read and further effected for all of the other tracks at steps C29 and C30. Finally, the data is transferred between the system and the floppy disk 34, i.e., the data is saved on and loaded from the floppy disk 34 at step C31.

2.4 PROCESS OF EXECUTING VARIOUS SUBROUTINES

2.4.1 Process of Executing Subroutine of Recording Data on Track

By executing this subroutine, a track in a recording mode for recording data thereon is first searched in the sector managing area or track memory. If such a track exists, the sector managing area is processed in such a manner that MIDI input data relating to the thus found track is recorded thereon. Namely, an empty sector is searched in the sector managing area and is reserved for recording data for managing the track found thereon. Further, the state of this track in the recording mode at the current time indicated by the tempo register 29 is determined, and on the basis of the result, the preparation for recording the input data on this track is made. If such a track does not exist, an error message is displayed at the LCD display portion 22 and the recording of the input data is not effected.

2.4.2 Process of Executing Subroutine of Playback of Data Recorded on Track

By executing this subroutine, a track in a reproducing mode for reproducing data recorded thereon is first searched in the track memory 32. If such a track exists, it is further determined whether or not any performance data corresponding to the time later than that currently indicated by the tempo register 29 in the thus found track in the playback mode. If such performance data is present, data corresponding to the current time indicated by the tempo register 29 is extracted from the data stored in this track and displayed at the LCD display portion 22. Further, preparation is made for reading out the data from this track in the playback mode at the time indicated by the tempo register 29. If such performance data does not exist, this track is released from the playback mode.

2.4.3 Process of Executing Subroutines for Various Processes to be Effected in Job Mode When a key of the data keying portion 11 is operated in the job mode, the above described 16 processes, such as the process DS-LOAD as shown in FIG. 11 are effected by executing the corresponding subroutines (hereunder referred to as job routines).

2.4.4 Process of Executing Subroutine for Displaying Data at LCD Display Portion 22

By executing this subroutine, various processes for reproducing data recorded on a track are effected. For example, the parameters displayed at the LCD display portion 22 are updated in response to an operation of the incrementer 21. Further, the content of data display at the LCD displaying portion 22 is refreshed when jumping from the main routine to the job routines or returning to the main routine from the job routines. Moreover, where empty sectors are not found in the process of recording the data on the track, an error message is displayed at the LCD display portion 22.

2.5 PROCESS OF INPUTTING/OUTPUTTING MIDI PLAYING DATA

Figure 19:
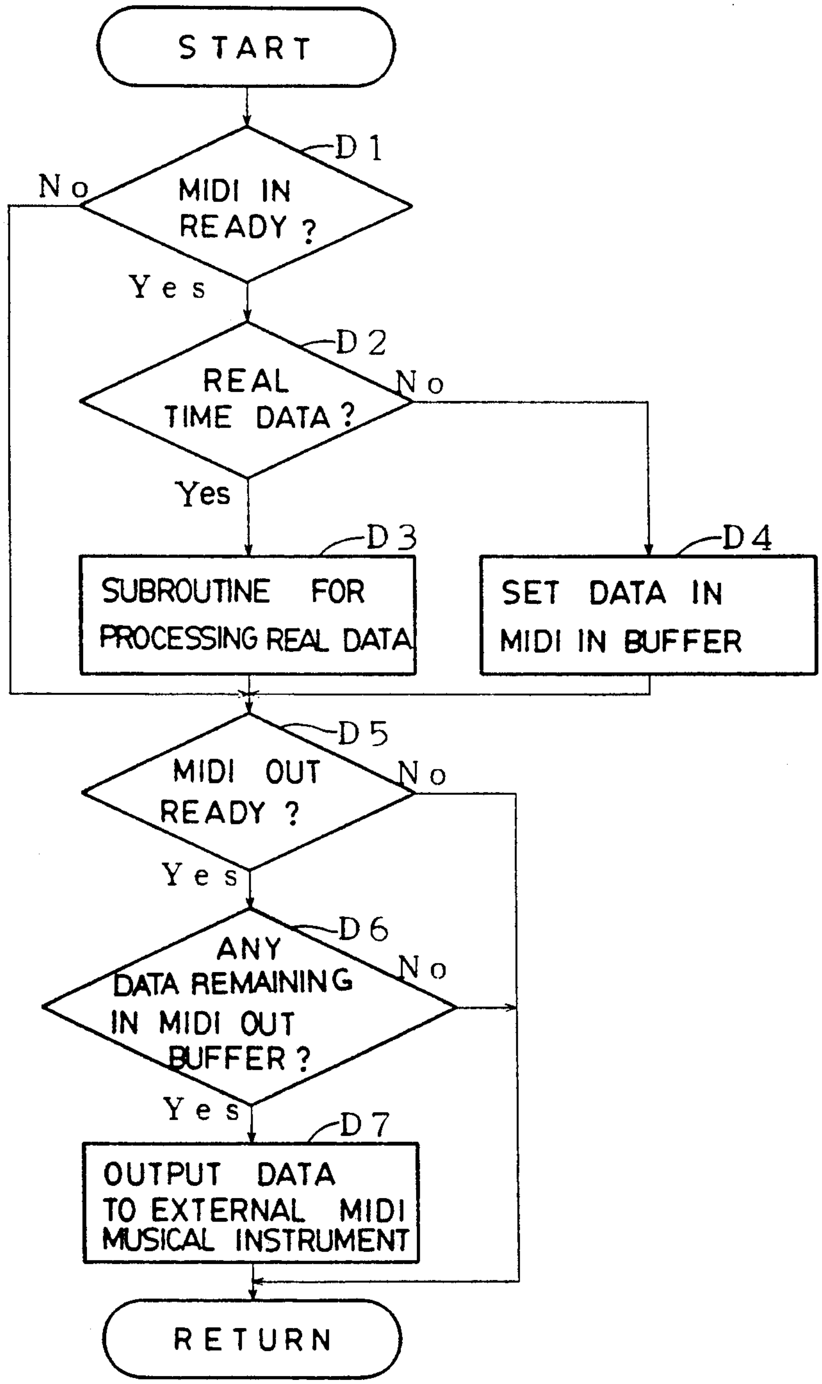
FIG. 19 is a flowchart explaining the input/output processes of MIDI performance data (hereunder referred to as MIDI data) used in the system of FIG. 3.

FIG. 19 is a flow chart illustrating a process of inputting/outputting MIDI performance data. The CPU 23 commences this process when data is set in the MIDI buffer 25. First, at step D1, it is determined whether or not the sequencer or CPU 23 is connected to a MIDI musical instrument and is ready to receive MIDI performance data. Then, at step D2, the CPU 23 determines whether or not the MIDI performance data sent from the MIDI musical instrument is real time data. If the MIDI performance data is real time data, a subroutine for processing the real time data is executed in step D3. Conversely, if the received data is not real time data, the data is sent to the MIDI IN buffer 27 of the working storage 26 at step D4. Then, at step D5, it is determined whether or not the sequencer is connected to the MIDI musical instrument and is ready to output MIDI performance data to the MIDI musical instrument. If the sequencer is connected to the MIDI musical instrument and is ready to output the MIDI performance data, at step D6, it is further determined whether or not any data remains in the MIDI buffer 27 of the working storage 26. If data remains therein, the remaining data is output to the external MIDI musical instrument connected thereto at step D7, and finally, the program returns to the main routine.

As described above, in this embodiment, to limit the value of the period of the interruption to the CPU 23 to within a constant range, the values of the tempo are first divided into four tempo ranges, i.e., the first tempo range ($25 \leqq W < 50$), the second tempo range ($50 \leqq W < 100$), the third tempo range ($100 \leqq W < 200$), and the fourth tempo range ($200 \leqq W < 400$), and thus, the width of the second tempo range, the width of the third tempo range, and the width of the fourth tempo range are two times, four times, and eight times as much as the width of the first tempo range, respectively. Therefore, if the values of the increment S used in the tempo register 29 in the second tempo range, the third tempo range, and the fourth tempo range are respectively set as two times, four times and eight times as much as the value of the increment S used in the first tempo range of the value of the tempo, the time interval between the interruptions of the CPU can be appropriately set for the performance of the CPU. Accordingly, the musical instrument connected to the sequencer provided with the interruption control apparatus of the present invention can play a piece of music at the tempo initially set or intended by a player, and even if the tempo range to which the set value of the tempo belongs is changed, the time interval between the interruptions of the CPU can be very easily limited within a constant range only by simply changing (for example, doubling, quadrupling, and so forth) the value of the increment S corresponding to each tempo range to which the current value of the tempo belongs.

Although a preferred embodiment of the present invention has been described above, it is understood that the present invention is not limited thereto.

Further, it is understood that other modifications will be apparent to those skilled in the art without departing from the spirit of the invention. For example, the processing effected by the CPU 23 at the time of the interruption caused by an interruption signal output by the programmable timer 24 may be a processing other than the processing of controlling the tempo of playing a piece of music. Further, the manner of obtaining tempo ranges by dividing the values of the tempo is not limited to that of FIG. 1(B), and the widths of the obtained tempo ranges need not have the relationships as shown in FIG. 1(B), in which the width of the second tempo range, the width of the third tempo range, and the width of the fourth tempo range are two times, four times, and eight times as much as the width of the first tempo range of the value of the tempo. Moreover, the manner of controlling the time interval between the successive interruptions by the programmable timer 24 is not limited to that described with reference to FIG. 1(B). Namely, other manners and methods of obtaining the tempo ranges may be employed and other manners and methods of controlling the time interval between the successive interruptions may be used only if the time interval between the successive interruptions of the CPU is limited to a constant range of the value thereof. The scope of the present invention, therefore, is determined solely by the appended claims.

I claim:

1. In a performance information processing system having a tempo setting means for pre-setting a tempo from a plurality of tempo ranges, for playing a piece of music and a performance information processor for processing performance information of the piece of music and controlling an electronic musical instrument connected thereto to perform the piece of music, and an interruption control apparatus for controlling interruptions of the performance information processor, the interruption control apparatus comprising:

a first time control means for regulating the length of a time interval between successive interruptions of the performance information processor according to the pre-set tempo so that said regulated time interval is limited within a predetermined constant range, and for outputting an interruption signal at said regulated time interval;

a second time control means for receiving said interruption signal and increasing a parameter stored therein by an increment with every reception of said interruption signal, said increment varying with respect to the pre-set tempo, and further for transferring performance information to the performance information processor each time said parameter reaches a predetermined value and thereafter resetting said parameter to zero; and an interruption processing means for receiving said interruption signal and interrupting the performance information processor in response to said received interruption signal.

2. An interruption control apparatus as set forth in claim 1, further comprising a playback means for playing back said performance information under control of said second time control means.

3. An interruption control apparatus as set forth in claim 1, the plurality of tempo ranges each tempo being set as $2^n$ (n=0, 1, 2 . . . ) times as much as that of a minimum range of the pre-set tempo.

4. An interruption control apparatus as set forth in claim 3, said second time control means changing the value of said increment corresponding to the preset-tempo of an nth range to a value of $2^n$ (n=0, 1, 2 . . . ) times as much as that of said increment corresponding to the pre-set tempo of said minimum range.

* * * * *